United States Patent
Bichsel

(10) Patent No.: US 9,011,051 B2
(45) Date of Patent: Apr. 21, 2015

(54) MULTI-SPINDLE MILLING

(75) Inventor: Steve L. Bichsel, Arlington, TX (US)

(73) Assignee: Lockheed Martin Corporation, Bethesda, MD (US)

(*) Notice: Subject to any disclaimer, the term of this patent is extended or adjusted under 35 U.S.C. 154(b) by 399 days.

(21) Appl. No.: 13/445,142

(22) Filed: Apr. 12, 2012

(65) Prior Publication Data

US 2013/0272813 A1 Oct. 17, 2013

(51) Int. Cl.
*B23C 1/08* (2006.01)
*B23C 1/12* (2006.01)

(52) U.S. Cl.
CPC .... *B23C 1/08* (2013.01); *B23C 1/12* (2013.01)

(58) Field of Classification Search
USPC ........ 408/42, 46, 53; 409/131, 132, 192, 201, 409/203, 211, 213, 216
IPC .................................................. B23C 1/04,1/08
See application file for complete search history.

(56) References Cited

U.S. PATENT DOCUMENTS

| | | | |
|---|---|---|---|
| 3,641,873 A | | 2/1972 | Jacques |
| 4,427,323 A | * | 1/1984 | Nielbock ........................ 408/42 |
| 4,717,297 A | | 1/1988 | Camloh et al. |
| 2005/0005412 A1 | | 1/2005 | Zolotarev et al. |
| 2012/0039677 A1 | * | 2/2012 | Davis .............................. 407/54 |

FOREIGN PATENT DOCUMENTS

| | | | |
|---|---|---|---|
| DE | 10147649 A1 | * | 4/2003 |
| DE | 102007038462 A1 | * | 2/2009 |
| DE | 102010024655 A1 | | 12/2011 |
| EP | 2161098 A1 | | 3/2010 |
| JP | 03208512 A | * | 9/1991 |
| WO | WO 2011088492 A1 | * | 7/2011 |

OTHER PUBLICATIONS

New CNC, "Multi Spindle 4' x 8' CNC Router," Dec. 8, 2011.*
AutoDrill, "Multi-Spindle Drill Heads for Drillings and Tapping," Jul. 31, 2011.*
European Search Report, Application No. 13162586.5-1702, Applicant: Lockheed Martin Corporation, dated Jul. 4, 2013, 5 pages.

(Continued)

*Primary Examiner* — Daniel Howell
*Assistant Examiner* — Michael Vitale
(74) *Attorney, Agent, or Firm* — Reising Ethington P.C.; John J. Snyder

(57) ABSTRACT

A milling apparatus is provided for cutting desired contours into a workpiece. The apparatus comprises a head that moves relative to a workpiece in a direction of cut. Spindles are supported on the head for rotation about parallel spaced-apart spindle z axes and comprise respective rotary cutters adapted for use in machining operations. A rotary head positioner is configured to be operatively connected between the head and a milling machine and to rotate the head about a head axis. A stagger controller is connected to the rotary head positioner and is configured to provide a desired swath of a cut to be formed in a workpiece by rotating the head to set a corresponding spindle stagger angle value.

32 Claims, 8 Drawing Sheets

(56) References Cited

OTHER PUBLICATIONS

European Search Report, Application No. 13162586.5-1702, Applicant: Lockheed Martin Corporation, dated Oct. 4, 2013; 9 pages.

Adjustable Multi-Spindle Milling Heads technical features, Angle head type 901 technical specification, Angle head type 902 technical specification, undated document, M.P.A. Srl, Bologna, Italy, 3 pages, recieved from client on Dec. 10, 2011.

* cited by examiner

MULTI-SPINDLE MILLING

CROSS-REFERENCES TO RELATED APPLICATIONS

Not Applicable

STATEMENT REGARDING FEDERALLY SPONSORED RESEARCH OR DEVELOPMENT

Not Applicable

BACKGROUND

1. Field

This invention relates generally to a milling system for cutting contours in a workpiece.

2. Description of the Related Art Including Information Disclosed Under 37 CFR 1.97 and 1.98

Multiple-spindle milling systems are known for use in vertical drilling operations and generally include two or more drill spindles supported for rotation on a head and carrying respective drill bits so that two or more closely-spaced holes can be drilled in one operation. Multiple-spindle CNC gantry-type milling systems are known to include two or more spindles that move in unison to produce identical parts in a concurrent and parallel process on a single bed. Such systems are capable of producing two or more parts in the same cycle time in which a comparable single spindle machine can produce only a single part. Also known in the art are multi-axis lathes that include machine operating systems and controllers programmed to simultaneously drill and mill or lathe a single part.

SUMMARY

A milling apparatus is provided for cutting desired contours into a workpiece. The apparatus may comprise a head configured to be carried by a milling machine configured to move the head and/or a workpiece to be machined, in such a way that relative motion is imparted between the head and the workpiece in a direction of cut. First and second spindles may be supported on the head for rotation about parallel spaced-apart spindle z axes and may include respective rotary cutters adapted for use in machining operations. A rotary head positioner may be operatively connected between the head and a milling machine, and configured to rotationally position the head about a head axis. A stagger controller may be connected to the rotary head positioner and may be configured to provide a desired cut swath in a workpiece by commanding the rotary head positioner to rotate the head as required to achieve a spindle stagger angle that will provide the desired step distance between spindle paths.

Also provided is a milling apparatus comprising a head configured to be carried by a milling machine adapted to move at least one of the head and a workpiece to be machined, such that relative motion is imparted between the head and the workpiece in a direction of cut. Spindles may be supported on the head for rotation about parallel spaced-apart spindle z axes and may include respective rotary cutters adapted for use in machining operations. Spindle z axis actuators may be operably connected to each spindle and configured to independently adjust the axial position of the spindles.

Also, a method is provided for cutting desired contours into a workpiece using a milling apparatus comprising a head supported on a milling machine for rotation about a head axis, and first and second spindles supported on the head for rotation about respective parallel spaced-apart spindle axes. The method includes positioning the head such that the head axis and spindle axes are oriented generally normal to a desired cut direction, adjusting spindle stagger angle relative to the desired cut direction by rotating the head about the head axis, rotating the spindles about their respective spindle axes, and cutting across a workpiece surface in the desired cut direction by moving at least one of the head and a workpiece to be machined, such that relative motion is imparted between the head and the workpiece in the desired cut direction and such that at least one of the spindles engages the workpiece.

DRAWING DESCRIPTIONS

These and other features and advantages will become apparent to those skilled in the art in connection with the following detailed description and drawings of one or more embodiments of the invention, in which.

Figure 1:
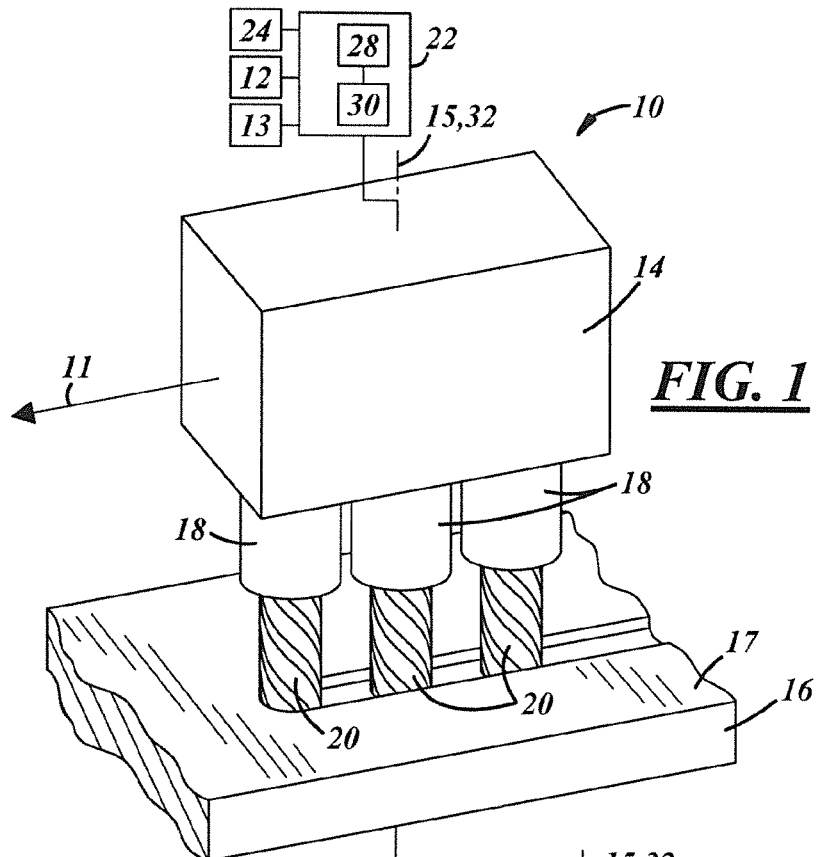
FIG. 1 is a schematic front-side-top isometric view of a single-head multi-spindle milling apparatus mounted with spindles having end mill cutters and moving in a direction of cut with respect to a workpiece and cutting the workpiece with no head rotation so as to present the spindles with a zero stagger angle relative to the direction of cut.
Figure 2:
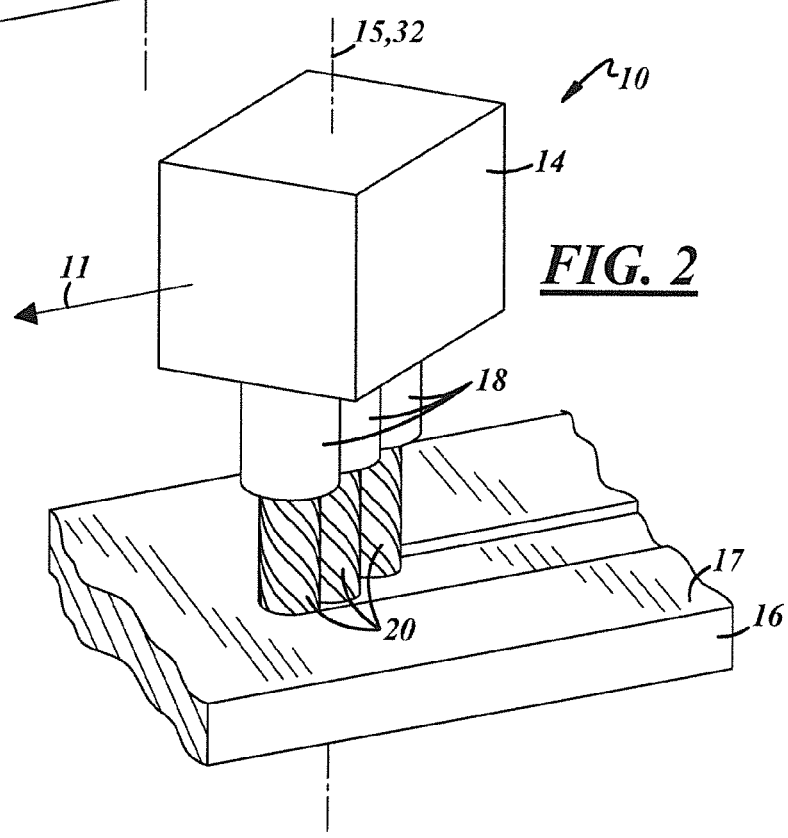
FIG. 2 is a schematic front-side-top isometric view of the apparatus of FIG. 1 and showing the head rotated relative to the direction of cut so as to present the spindles in a staggered relationship relative to the direction of cut.
Figure 4:
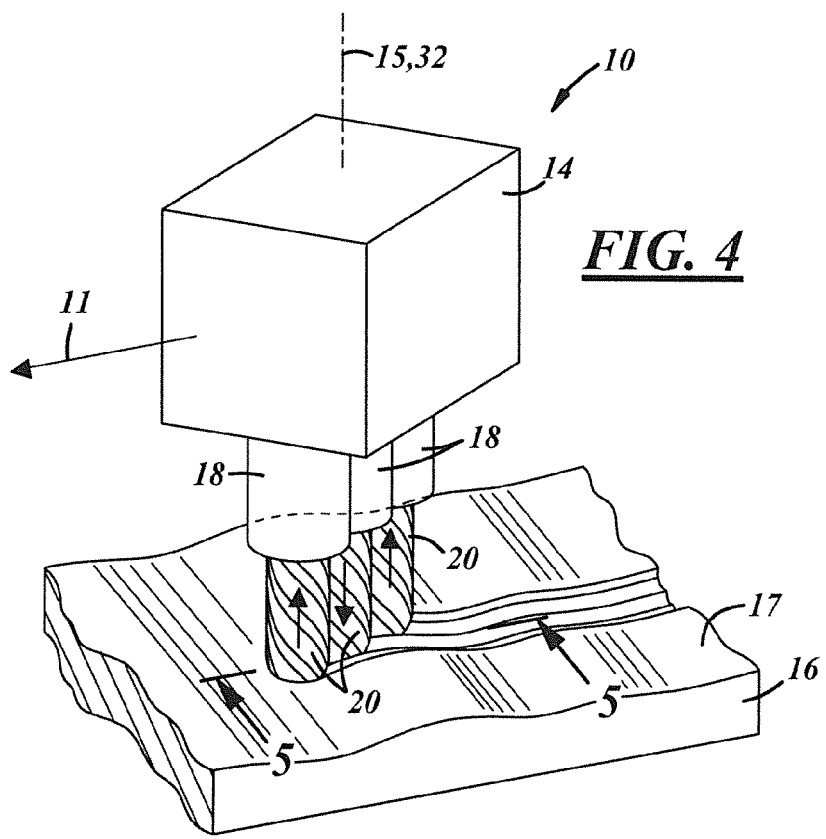
Figure 5:
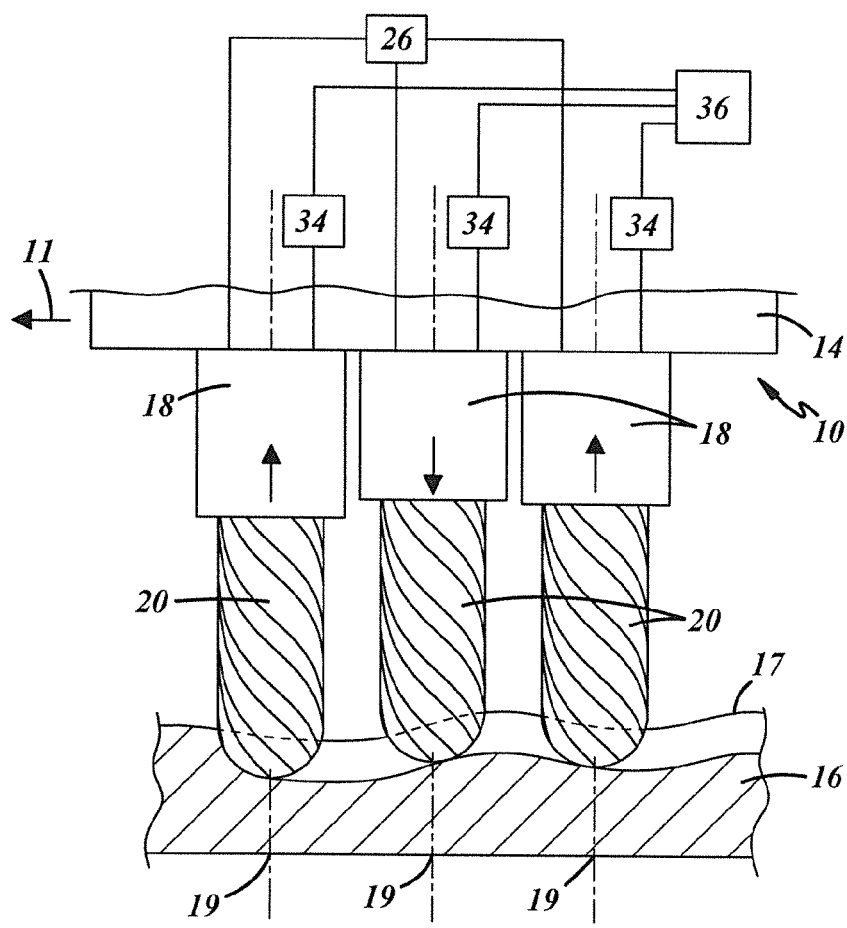
Figure 6:
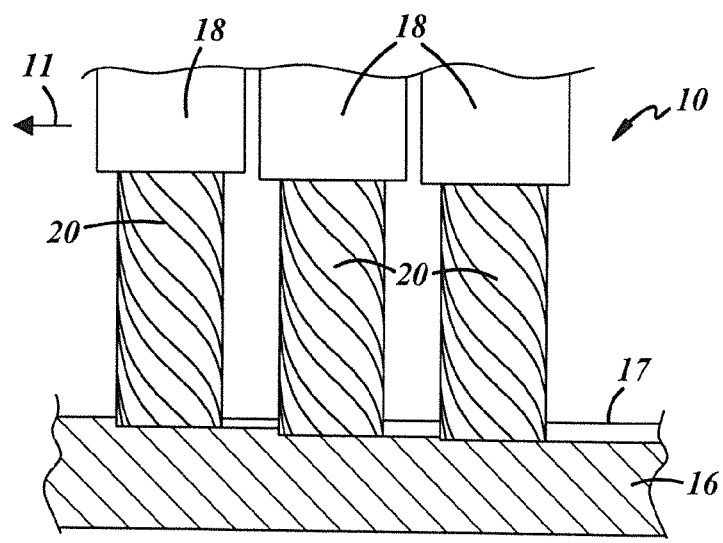
Figure 7:
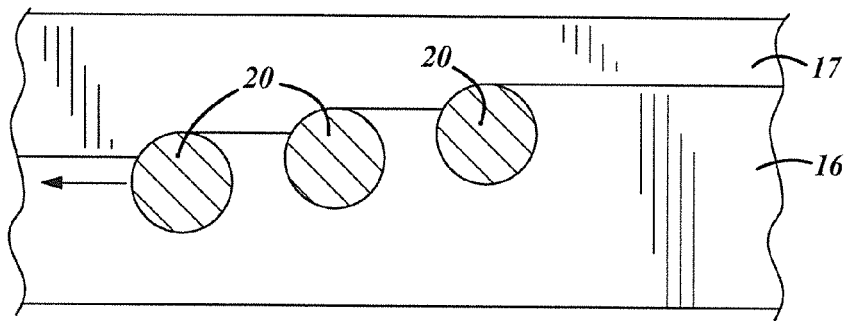
Figure 8:
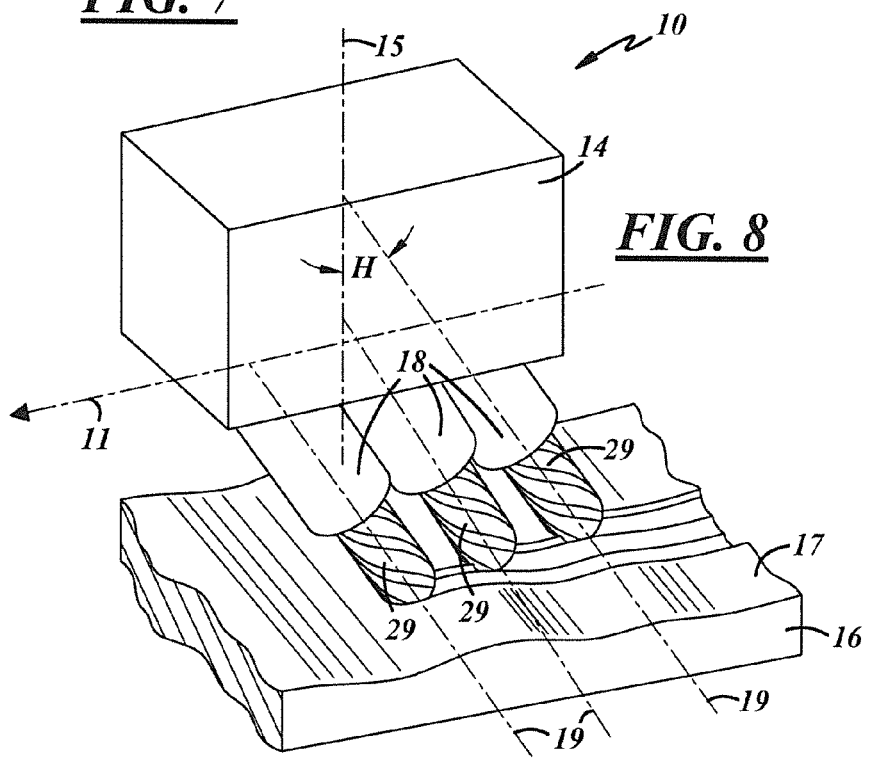
Figure 9:
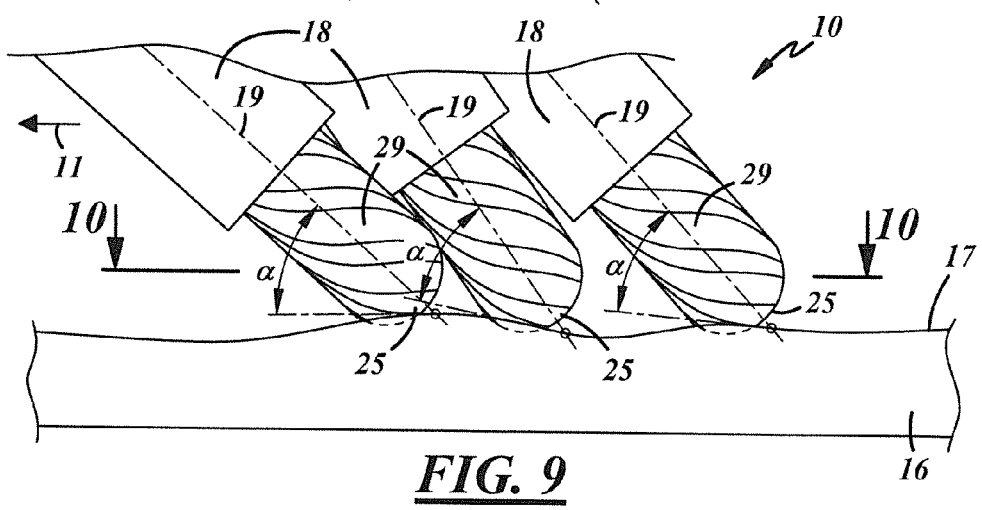
Figure 10:
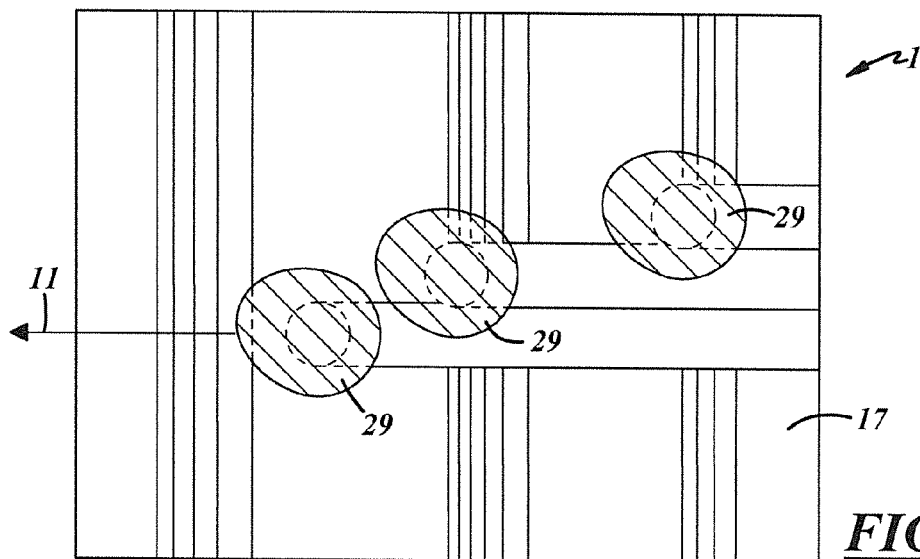
Figure 11:
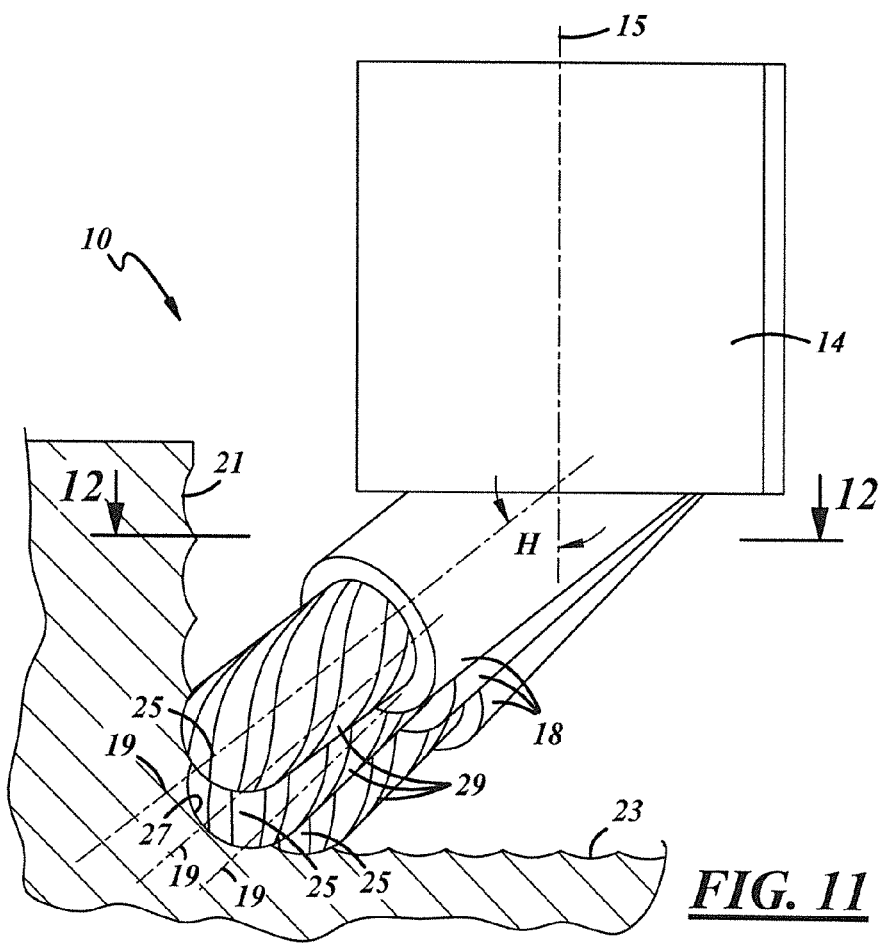
Figure 12:
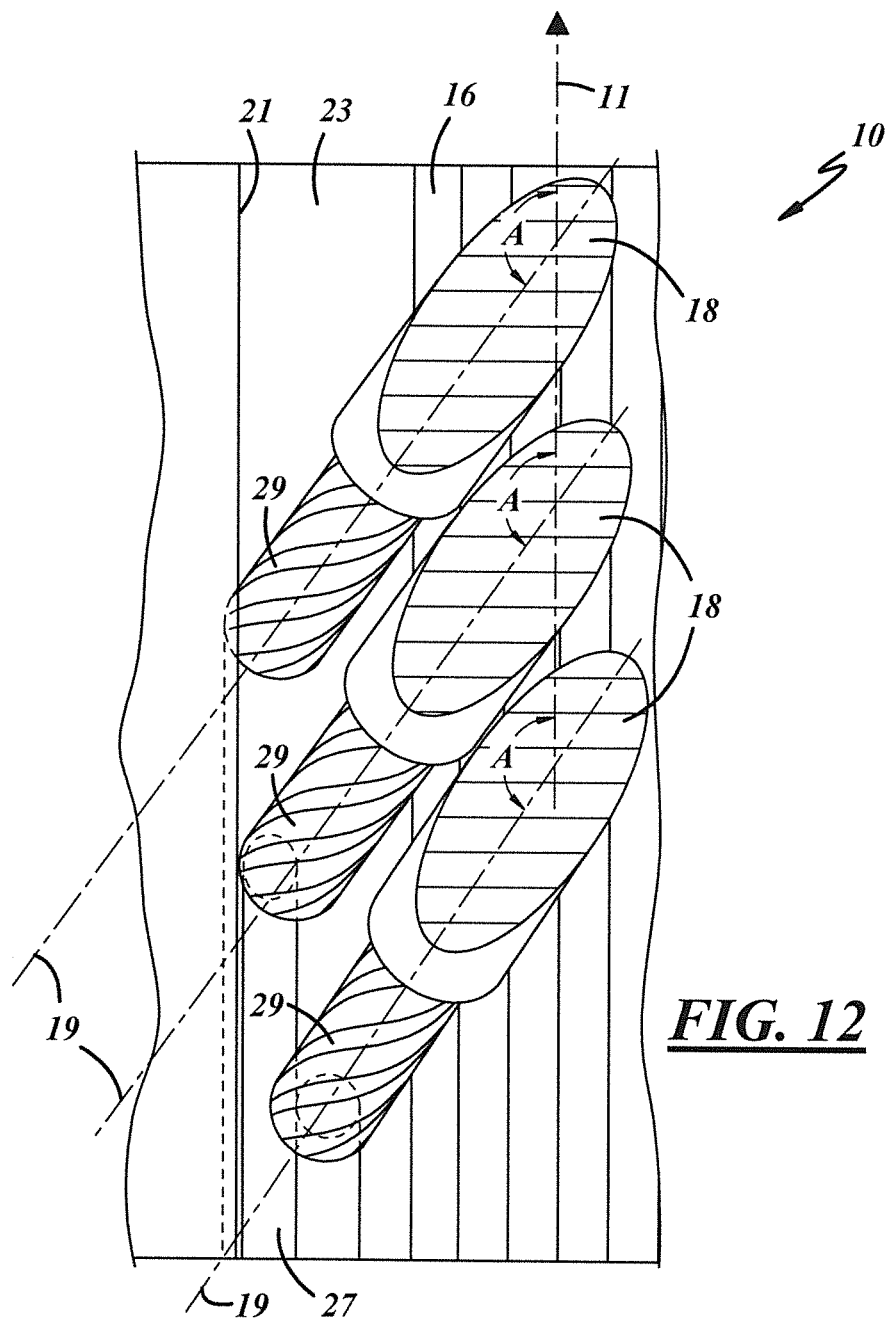
Figure 13A:
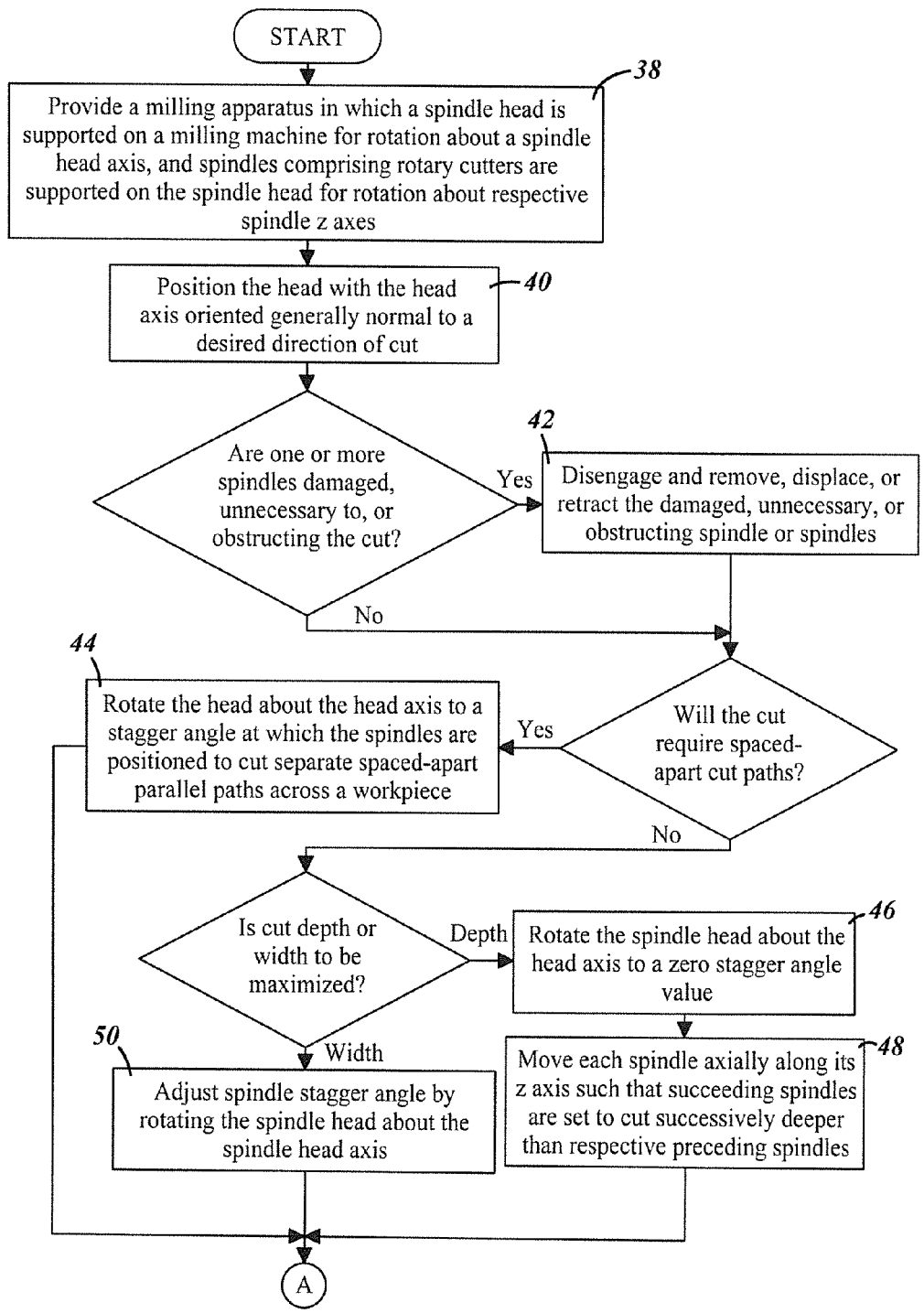
Figure 13B:
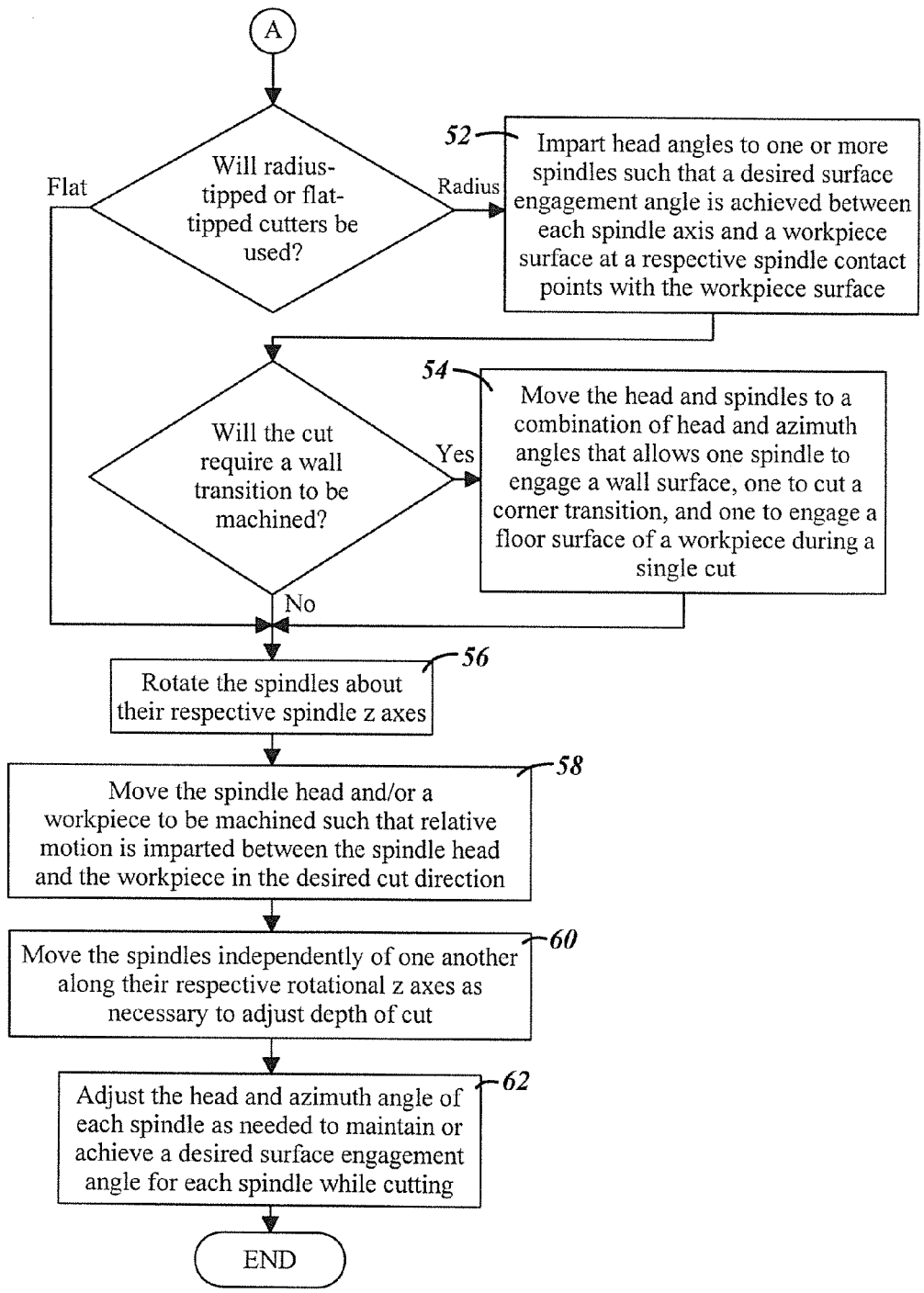

FIG. 4 is a schematic front-side-top isometric view of the apparatus of FIG. 1 with the head rotated relative to the direction of cut as shown in FIG. 2 and showing the spindles moving up and down along their respective z axes to vary their respective depths of cut into a workpiece as the apparatus moves in a direction of cut relative to the workpiece and cuts the workpiece with the head rotated so as to present the spindle in a staggered relationship relative to the direction of cut;

FIG. 5 is a schematic fragmentary partially cross-sectional side view of the apparatus of FIG. 1 taken along line 5-5 of FIG. 4 and shown with radius-tipped cutters installed;

FIG. 6 is a schematic fragmentary partially cross-sectional side view of the apparatus of FIG. 1 with trailing spindles shown cutting successively deeper than a lead spindle;

FIG. 7 is a schematic fragmentary cross-sectional view of the apparatus of FIG. 1 shown mounted with spindles having cutters adapted for side milling and moving in a direction of cut with respect to a workpiece and cutting the workpiece with a low stagger angle so as to make sequential cuts laterally into the workpiece;

FIG. 8 is a schematic front-side-top isometric view of the apparatus of FIG. 1 mounted with spindles having radius-tipped cutters and shown with the head rotated relative to the direction of cut and with the spindles angled aft relative to the direction of cut;

FIG. 9 is a schematic fragmentary side view of the apparatus of FIG. 8;

FIG. 10 is a schematic partially cross-sectional top view of the apparatus of FIG. 9 taken along line 10-10 of that Figure;

FIG. 11 is a schematic forward end view of the apparatus of FIG. 8 with the head rotated slightly relative to the direction of cut, and with spindles shown angled aft and laterally relative to the direction of cut to form an upstanding wall, floor, and intervening corner in a workpiece;

FIG. 12 is a schematic top cross-sectional view of the apparatus of FIG. 11 taken along line 12-12 of that Figure; and FIG. 13 is a flow chart showing a method for cutting desired contours into a workpiece using the milling apparatus of FIGS. 1-12.

DETAILED DESCRIPTION

A milling apparatus for cutting desired contours into a workpiece is generally shown at 10 in FIGS. 1-6. The apparatus 10 may include a milling machine 12 configured to carry a head 14. The milling machine 12 may be configured to move at least one of the head 14 and a workpiece 16 to be machined, such that relative motion is imparted between the head 14 and the workpiece 16 in a direction of cut or cut direction 11. In Figures Spindles 18 may be supported on the head 14 for rotation about parallel spaced-apart spindle z axes 19 and may include respective rotary cutters 20 adapted for use in machining operations.

As best shown in FIGS. 1-4, the apparatus 10 may also include a rotary head positioner 22 configured to be operatively connected between the head 14 and a milling machine 12, and to rotationally position the head 14 about a head axis 15 as directed by a motion control processor 13. A stagger controller 24 may be connected to the rotary head positioner 22, which may be configured to provide a desired cut swath (i.e., either a cut width measured transverse to cut direction 11 in a workpiece surface generally perpendicular to the spindle z axes 19 as shown in FIG. 6, or a cut depth measured transverse to cut direction 11 in a workpiece surface generally parallel to the spindle z axes 19 as shown in FIG. 7) in a workpiece 16 by commanding the rotary head positioner 22 to rotate the head 14 as required to achieve a desired degree of spindle stagger or stagger angle S (i.e., a degree of misalignment of the spindle axes 19 relative to the cut direction 11 and within a range of achievable spindle stagger angle values) that will allow the desired cut swath to be cut in a workpiece 16.

Figure 3:
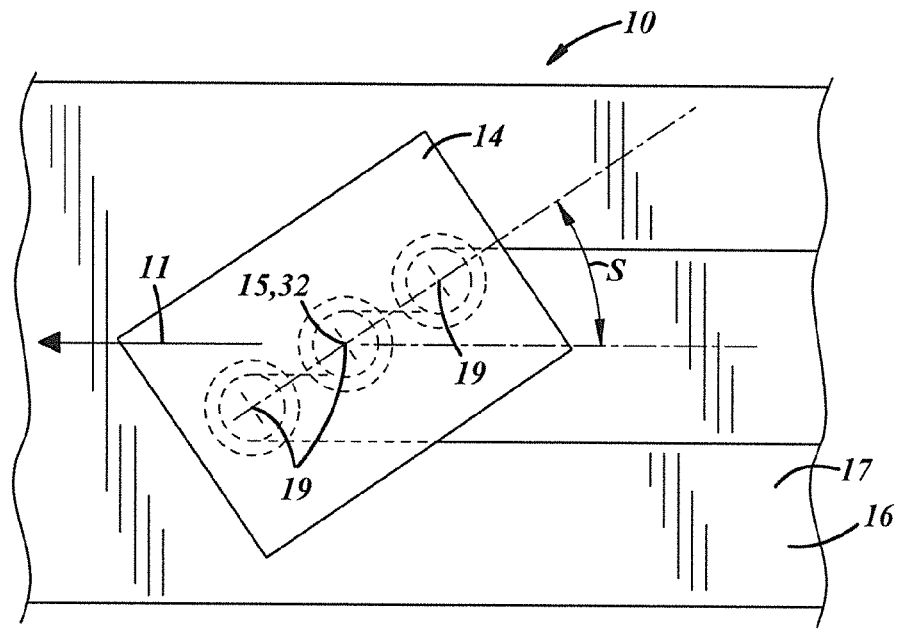
FIG. 3 is a schematic top view of the apparatus and workpiece of FIG. 1 with the head rotated relative to the direction of cut as shown in FIG. 2.

In other words, and as best shown in FIG. 3, the stagger controller 24 may be configured to vary a stagger angle S measured between the cut direction 11 and an imaginary line intersecting and oriented normal to the spindle axes 19. The stagger controller 24 may be configured to do this by causing the rotary head positioner 22 to rotate the head 14 as necessary to achieve whatever spindle stagger angle S is necessary to provide the desired cut swath. In yet other words, the stagger controller 24 may be programmed to either align or stagger the spindle axes 19 to some degree relative to the direction of cut to adjust a swath of a cut to be made in a workpiece 16 by the rotary cutters 20 in a milling operation. In still other words, the stagger controller 24 may be configured to control alignment of the cutters 20 off-axis to the cut direction 11. This staggering of the spindle axes 19 reduces the number of passes required to machine a given workpiece 16, which reduces guide wear, power consumption, and part run times. Mounting multiple spindles 18 on a single head 14 allows more cutter passes to be made per inch of head movement and thus reduces the number of head passes required to produce a part.

The stagger controller 24 may be configured to rotate the head 14 as required to vary the stagger angle S within a desired range of stagger angles S between zero and a maximum number of degrees of stagger. The stagger controller 24 may be configured to do this during a milling operation while moving along the direction of cut, adjusting stagger angle S as required to form a cut having a desired variable cut swath along a length of the cut. By controlling stagger angle S with head rotation, the cutter array can thus be phased to produce part features such as walls or flanges. Spindle stagger angle S may be adjusted to position the cutters 20 to cut a single path across a workpiece 16, or to cut separate spaced-apart parallel paths across a workpiece, thus forming a wall or flange between cutter paths. As shown in FIG. 7, the head 14 may be positioned such that the spindle axes 19 are positioned to engage a workpiece wall generally parallel to the spindle axes 19, and the spindle stagger angle S may be adjusted to position the spindle cutters 20 with lateral offsets to make sequentially deeper cuts laterally into the workpiece 16.

This arrangement allows one machine 12 to be three or more times more productive in finishing complex workpiece surfaces that require high tolerance profiles. This functionality requires additional degrees of motion, which enhance programming versatility and allow for a desired step distance to be provided between passes so as to generate a smoothly contoured surface. The additional degrees of motion are required to enable the machine to control the rotational position of an array of cutters rather than just a single cutter. Step distance is the distance a cutter is offset between successive cutter passes. The numerical control program derives a desired or "proper" step distance for a given application by taking into account a number of factors that may include a local radius of a workpiece surface to be cut, the radius of the cutter in use, and a desired surface finish. A cutter having a flat end surface or tip would have difficulty producing a contoured surface and a cutter having a small radius tip would create a choppy surface if the passes were too far apart. Likewise, to produce a smooth surface, the step distance reduction will linearly increase the number of passes. The closer the cutter tip radius matches a radius in a workpiece contour, the fewer passes are needed to achieve a desired surface quality.

As shown in FIG. 1, the rotary head positioner 22 may comprise a head rotator motor 28 and a head rotator gear 30 operatively connected between the head rotator motor 28 and the head 14. The head axis 15 may be coaxially aligned with a motor centerline 32 of the head rotator motor 28 and may be disposed parallel to the spindle axes 19.

As shown in FIG. 5, the head 14 may be configured to drive rotary motion of the spindles 18 about their respective spindle axes 19 via at least one head motor 26 carried by the head 14. The at least one head motor 26 may be operatively connected to the spindles 18, and configured to drive the spindles 18 in rotation about their respective spindle axes 19. The head 14 may be further configured to rotate one or more of the spindles 18 in opposite directions. This may be done using simple mated gears to distribute rotary power to the selected ones of the spindles 18. The head 14 may also be configured to raise out of contact any one or more of the spindles 18 that are not needed in a given operation.

As shown in FIG. 5, one or more spindle z axis actuators 34 may be operably connected to one or more spindles 18, respectively, and configured to move the spindles 18 independently of one another along their respective rotational z axes 19 (as shown in FIGS. 4 and 5) such that a desired contour may be cut in a workpiece 16. A z axis position controller 36 may also be connected to the spindle z axis actuators 34 and configured to move the spindles 18 independently of one another along their respective z axes 19 such that a desired contour may be cut in a workpiece 16. Each z axis position controller may be configured to move its spindle independently within a range of +/−1" along its respective z axis. In other embodiments, however, the position controller may be configured move the spindles in a larger or smaller range along their z axes. Alternatively, a center spindle of a three-spindle 18 arrangement may be fixed with only the two outer remaining spindles being movable along respective z axes. This arrangement would require only two z axis actuators 34 to be operably connected to the two outer spindles 18, respectively, and configured to move those spindles independently relative to one another and relative to the stationary center spindle.

For example, and as shown in FIG. 6, where its desirable that a deeper, rather than a wider cut be made in a workpiece surface 17 in a single cutting pass, a zero spindle stagger angle S may be selected relative to the chosen cut direction 11, and a depth of cut for one or more trailing spindles may be adjusted to cut deeper than a leading spindle. Also, the depth of cut for each spindle 18 following the leading spindle may be set to cut successively deeper than a preceding spindle 18. The difference in spindle z axis positions between adjacent successive spindles 18 may be approximately 0.20", and the difference in spindle axis positions between a final two adjacent successive spindles 18 may be less than the difference between spindle axis positions of preceding spindles 18 such as, for example, approximately 0.020", to provide a finishing cut.

As is well known in the art, where the rotary cutters are radius-tipped cutters 29, the cutters 29 may have helical cutting edges and either a full ball nose or partial ball or radius-tip as shown in FIGS. 8-12. A radius-tip allows a cutter to nest into corners in a workpiece to produce rounded transitions needed to reduce stress concentrations in a resulting part as shown in FIG. 11.

The apparatus may be configured to move one or more of the spindles 18 through a range of head angles H and azimuth angles A, the head angle H being an angle at which a spindle 18 extends from the head 14 as measured between the spindle's rotational axis 19 and the head axis 15 as shown in FIG. 8, and the azimuth angle A being an angle at which a spindle 18 extends from the head 14 as measured between the spindle's rotational axis 19 and the direction of cut 11 as shown in FIG. 12. One or more of the spindles 18 may, for example, may have a head angle H that is directed aft, i.e., at a 180 degree azimuth angle, or opposite the cut direction 11 as shown in FIGS. 8-11. This may be done in such a way that a desired surface engagement angle α is maintained within an acceptable range between the spindle axis 19 and a workpiece surface 17 as measured at a point of contact between the workpiece surface 17 and the spindle 18. The maintenance of such a surface engagement angle α (and/or an acceptable range of angles centered thereon) may be advantageous where, for example, the spindle 18 includes a radius-tipped cutter 29. When using a radius-tipped cutter 29 it is desirable for a relatively slow-moving axial region 25 of that radius-tipped cutter 29 to be tilted away from contact with the workpiece 16 so that relatively low angular velocity motion at the axial region 25 of the cutter 20 will not have a negative effect on the quality of the cut.

As shown in FIGS. 11 and 12, the range of head angles H and azimuth angles A through which the apparatus 10 may be configured to move one or more of the spindles 18 may include a combination of such angles that allows a desired surface engagement angle α (and/or an acceptable range of angles centered thereon) to be maintained between the spindle axis and a workpiece wall surface 21 oriented generally parallel to the cut direction 11 and to the head axis 15. As best shown in FIG. 11, one of the spindles 18 may be angled to cut a radiused transition 27 between the workpiece wall surface 21 and a workpiece floor surface 23 disposed generally normal to the head axis 15, while, once again, maintaining the axial region 25 of the radius-tipped cutter 29 away from contact with the workpiece 16. As shown in FIG. 11, spindles 18 carried by a head 14 may be angled to cause one of the spindles 18 to engage and cut a workpiece floor surface 23 while another of the spindles 18 is angled to engage and cut a workpiece wall surface 21 and a third one or the spindles 18 is angled to engage and cut a radiused transition 27 between the workpiece wall surface 21 and floor surface 23—all in a single pass.

As shown in FIGS. 8 and 9, the apparatus may be configured to automatically and continuously adjust the head angle H of one or more of the spindles during a cut such that a desired surface engagement angle α is maintained while following contours in a workpiece surface. As shown in FIGS. 11 and 12, the apparatus may also be configured to automatically and continuously adjust both the head angle H and the azimuth angle A of at least one of the spindles 18 so that a desired surface engagement angle α can be maintained while following contours in a workpiece wall surface 21 or radiused transition 27 during a cut.

In practice, and as indicated in flow chart form in FIG. 13, to cut desired contours into a workpiece 16, the head 14 may first be positioned such that the head axis 15 and spindle axes 19 are oriented generally normal to a desired cut direction 11 as indicated in action step 40. The spindle stagger angle S may then be adjusted (in a range from zero to a given maximum number of degrees of stagger) relative to the desired cut direction 11 by rotating the head 14 about the head axis 15 as indicated in action steps 44, 46, and 50. As indicated in action step 52, the head angle H and/or azimuth angle A of one or more of the spindles 18 may be adjusted to achieve a desired surface engagement angle α between a spindle axis 19 and the workpiece 16. The spindles 18 and their rotary cutters 20 may be rotated around their respective spindle z axes 19 as indicated in action step 56. Machining may commence by executing one or more of the previous steps either before or while at least one of the head 14 and the workpiece 16 is moved relative to the other so that relative motion is imparted between the head 14 and the workpiece 16 in a desired cut direction 11 as indicated in action step 58. As indicated in action step 60, each cutter's depth of cut may be adjusted by moving its respective spindle 18 along its spindle z axis 19 to a desired spindle z axis position. The spindles 18 may be moved independently of one another along their respective rotational z axes 19. Relative motion of the spindles 18 along their respective rotational z axes may preferably be within a range of approximately +/−1, but may be with either greater or lesser ranges of z axis motion. As shown in action step 62, the head angle H and/or the azimuth angle A of each spindle 18 from the head axis 15 may be continuously adjusted during a cut to maintain a desired surface engagement angle α between respective spindle axes of the spindles 18 and the workpiece surface 17 at respective points of contact of the spindles 18 with the workpiece surface 17 as each spindle 18 rides along contours in the workpiece surface 17.

Optionally, one or more spindles 18 may be disengaged by removal, withdrawal, and/or retraction either before or during a cut as shown in action step 42. In other words, one or more spindles may be disengaged and moved to respective positions where they will not contact the workpiece during a cut. This may be done where, for example, the disengaged spindle or spindles 18 are not needed to achieve a desired geometry, or where one or more spindles 18 would introduce undesired geometry to a workpiece 16 or otherwise impede achievement of such a desired geometry.

A multiple spindle milling apparatus constructed and operated as described above can machine complex contours into a workpiece with productivity multiplied by the number of heads employed, while using the floor space of a single CNC machine. As described above, the time requirements, power requirements, wear, and thus maintenance requirements are therefore reduced on a per part basis. Furthermore, the independent motion of the spindles allows such a machine to completely retract one or more spindles, allowing the apparatus to operate as a single-spindle or dual-spindle machine in applications where single or dual-spindle operation would be advantageous, and where known multiple-spindle machines would require replacement of the multiple spindle head or removal of one or more spindles before operation could resume. In anticipation of a potential mechanical failure of one or more spindles or cutters, a machine constructed as described above could also be programmed to detect and retract any failed spindles or cutters and to modify its operation as necessary to continue milling operations with the remaining spindles, keeping the production line moving until repairs can be made. The extra degrees of freedom may also be useful in machining processes that use different types of cutters, including non-rotary cutting heads and devices such as reamers, lasers, or water jets.

This description, rather than describing limitations of an invention, only illustrates an embodiment of the invention recited in the claims. The language of this description is therefore exclusively descriptive and is non-limiting. Obviously, it's possible to modify this invention from what the description teaches. Within the scope of the claims, one may practice the invention other than as described above.

What is claimed is:

1. A milling apparatus for cutting desired contours into a workpiece, the apparatus comprising:
    a head configured to be carried by a milling machine that is configured to move at least one of the head and a workpiece to be machined in such a way that relative motion is imparted between the head and the workpiece in a direction of cut;
    first and second spindles supported on the head for rotation about parallel spaced-apart spindle z axes and comprising respective rotary cutters adapted for use in machining operations;
    a rotary head positioner configured to be operatively connected between the head and the milling machine and to rotate the head about a head axis;
    a stagger controller is connected to the rotary head positioner and is configured to provide a desired cut swath in the workpiece by commanding the rotary head positioner to rotate the head as required to achieve a spindle stagger angle that will provide the desired step distance between spindle paths; and
    a first spindle z axis actuator operably connected to the first spindle and configured to move the first spindle along the first spindle z axis.

2. The milling apparatus as defined in claim 1 in which the head is configured to drive rotary motion of the first and second spindles about their respective spindle z axes.

3. The milling apparatus as defined in claim 2 in which the apparatus includes at least one head motor carried by the head, operatively connected to the first and second spindles, and configured to drive the spindles in rotation about their respective first and second spindle z axes.

4. A milling apparatus as defined in claim 1 in which the rotary head positioner comprises a head rotator motor carried by the head and a head rotator gear carried by the head and operatively connected between the head rotator motor and the head.

5. A milling apparatus as defined in claim 1 in which the head axis is coaxially aligned with a motor centerline of the head rotator motor and is disposed parallel to the first and second spindle z axes.

6. The milling apparatus as defined in claim 5 in which the rotary cutters are radius tipped.

7. The milling apparatus as defined in claim 1 in which the apparatus includes a second spindle z axis actuator operably connected to the second spindle and configured to move the second spindle along the second spindle z axis.

8. The milling apparatus as defined in claim 7 in which the apparatus includes a z axis position controller connected to the first and second z axis actuators and configured to move the first and second spindles independently of one another along their respective first and second spindle z axes.

9. The milling apparatus as defined in claim 7 in which one or more additional spindle z axis actuators are operably connected to one or more additional spindles, respectively, and configured to move the one or more additional spindles independently of one another along their respective first and second spindle z axes.

10. The milling apparatus as defined in claim 9 in which the apparatus includes a z axis position controller connected to the first, second, and one or more additional spindle z axis actuators and configured to move the first, second, and one or more additional spindles independently of one another along their respective first and second spindle z axes.

11. The milling apparatus as defined in claim 1 in which the apparatus includes a second spindle z axis actuator operably connected to the second spindle and configured to move the second spindle along its rotational z axis.

12. The milling apparatus as defined in claim 11 in which the apparatus includes a z axis position controller connected to the first and second z axis actuators and configured to move the first and second spindles independently of one another along their respective first and second spindle z axes.

13. The milling apparatus as defined in claim 11 in which the apparatus includes one or more additional spindle z axis actuators are operably connected to one or more additional spindles, respectively, and configured to move the one or more additional spindles independently of one another along their respective first and second spindle z axes.

14. The milling apparatus as defined in claim 13 in which the apparatus includes a z axis position controller connected to the first, second, and one or more additional spindle z axis actuators and configured to move the first, second, and one or more additional spindles independently of one another along their respective first and second spindle z axes.

15. A milling apparatus for cutting desired contours into a workpiece, the apparatus comprising:
    a head configured to be carried by a milling machine that is configured to move at least one of the head and a workpiece to be machined in such a way that relative motion is imparted between the head and the workpiece in a direction of cut;
    first and second spindles supported on the head for rotation about parallel spaced-apart spindle z axes and comprising respective rotary cutters adapted for use in machining operations;
    a rotary head positioner configured to be operatively connected between the head and the milling machine and to rotate the head about a head axis;
    a stagger controller is connected to the rotary head positioner and is configured to provide a desired cut swath in the workpiece by commanding the rotary head positioner to rotate the head as required to achieve a spindle stagger angle that will provide the desired step distance between spindle paths; and the apparatus being configured such that an angle of at least one of the first and second spindles relative to the head can be adjusted aft relative to the direction of cut as measured from the head axis.

16. The milling apparatus as defined in claim 15 in which the apparatus is configured to adjust during a cut the angle of at least one of the first and second spindles aft relative to the head.

17. A milling apparatus as defined in claim 15 in which the apparatus is configured such that an angle of at least one of the first and second spindles relative to the head can be adjusted laterally and aft relative to the direction of cut as measured from the head axis.

18. The milling apparatus as defined in claim 17 in which the apparatus is configured to adjust during a cut the angle of at least one of the first and second spindles laterally and aft relative to the direction of cut as measured from the head axis.

19. A method for cutting desired contours into a workpiece using a milling apparatus comprising a head supported on a milling machine for rotation about a head axis, and first and second spindles supported on the head for rotation about respective parallel spaced-apart spindle z axes; the method including the steps of:
   positioning the head such that the head axis and spindle z axes are oriented generally normal to a desired cut direction and the spindles are positioned to engage a workpiece wall generally parallel to the spindle z axes;
   adjusting spindle stagger angle relative to the desired cut direction by rotating the head about the head axis such that the rotary cutters are positioned with lateral offsets to make sequentially deeper cuts laterally into the workpiece wall;
   rotating the first and second spindles about their respective spindle z axes; and
   cutting across a workpiece surface in the desired cut direction by moving at least one of the head and the workpiece to be machined, such that relative motion is imparted between the head and the workpiece in the desired cut direction and such that at least one of the first and second spindles engages the workpiece.

20. The method of claim 19 including the additional step of adjusting a first spindle depth of cut by moving the first spindle along its spindle axis to a desired first spindle axis position.

21. The method of claim 20 including the additional step of adjusting a second spindle depth of cut by moving the second spindle along its spindle axis to a desired second spindle axis position.

22. The method of claim 20 including the additional step of cutting a desired contour in the workpiece by moving the first and second spindles independently of one another along their respective spindle axes while relative motion is being imparted between the head and the workpiece in the desired cut direction.

23. The method of claim 20 in which the step of adjusting spindle stagger includes rotating the head about the head axis to a stagger angle at which the first and second spindles are positioned to cut a single path across the workpiece.

24. The method of claim 20 in which the step of adjusting spindle stagger includes rotating the head about the head axis to a stagger angle at which the first and second spindles are positioned to cut separate spaced-apart parallel paths across the workpiece.

25. The method of claim 19 in which:
   the step of adjusting spindle stagger angle includes rotationally positioning the head about the head axis to a zero stagger angle value relative to the desired cut direction; and
   the method includes the additional steps of moving the second spindle into a position deeper along its spindle z axis than the first spindle is positioned along its spindle z axis; and
   the step of cutting a path includes imparting relative motion between the head and the workpiece in the desired cut direction such that the first spindle precedes the second spindle along a single cut path with the second spindle adding depth to a cut made by the first spindle.

26. The method of claim 19 including the additional step of orienting at least one of the first and second spindles such that its axis is angled relative to the head axis.

27. The method of claim 26 including an additional step of orienting at least one of the first and second spindles relative to the head such that its axis is generally parallel to the head axis.

28. The method of claim 26 in which the step of cutting across the workpiece surface includes adjusting the angle of at least one of the first and second spindles aft relative to the desired cut direction as measured from the head axis such that a desired surface engagement angle is maintained between the spindle axis of at least one of the first and second spindles and a workpiece surface as measured at a contact point of the workpiece surface with the at least one of the first and second spindles.

29. The method of claim 28 in which the step of cutting across the workpiece surface includes adjusting the angle of at least one of the first and second spindles laterally and aft relative to the desired cut direction as measured from the head axis such that a desired surface engagement angle is maintained between a workpiece wall surface and the spindle axis of at least one of the first and second spindles as measured at a contact point of the workpiece wall surface with the at least one of the first and second spindles.

30. The method of claim 19 including the additional step of disengaging one of the first and second spindles from the workpiece.

31. The method of claim 19 including the additional step of withdrawing one of the first and second spindles to a position clear of the workpiece.

32. The method of claim 31 in which the step of withdrawing one of the first and second spindles includes withdrawing one of the first and second spindles along its respective spindle z axis.

* * * * *